United States Patent
Maeda et al.

(10) Patent No.: US 10,007,564 B2
(45) Date of Patent: Jun. 26, 2018

(54) INFORMATION PROCESSING APPARATUS AND OPERATION VERIFYING METHOD

(71) Applicant: FUJITSU LIMITED, Kawasaki-shi, Kanagawa (JP)

(72) Inventors: Takayuki Maeda, Yokohama (JP); Tomohiro Ohtake, Kawasaki (JP); Toshihiro Kodaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/077,156

(22) Filed: Mar. 22, 2016

(65) Prior Publication Data

US 2016/0306686 A1    Oct. 20, 2016

(30) Foreign Application Priority Data

Apr. 20, 2015    (JP) ................................. 2015-085861

(51) Int. Cl.
*G06F 9/54*    (2006.01)

(52) U.S. Cl.
CPC .............. *G06F 9/543* (2013.01); *G06F 9/541* (2013.01)

(58) Field of Classification Search
None
See application file for complete search history.

(56) References Cited

U.S. PATENT DOCUMENTS

| 2006/0130041 | A1  | 6/2006 | Pramanick et al. |
| 2011/0145653 | A1* | 6/2011 | Broadfoot .......... G06F 11/3604 714/38.1 |
| 2012/0084407 | A1* | 4/2012 | Soulios ............ G06F 17/30306 709/220 |
| 2012/0084607 | A1* | 4/2012 | Lam .................... G06F 11/3684 714/38.1 |

FOREIGN PATENT DOCUMENTS

| JP | 2006-148558 | 6/2006 |
| JP | 2008-533542 | 8/2008 |
| JP | 2010-191543 | 9/2010 |

* cited by examiner

*Primary Examiner* — Syed Roni
(74) *Attorney, Agent, or Firm* — Fujitsu Patent Center

(57) ABSTRACT

An information processing apparatus to verify an operation of an application program includes a processor configured to, upon receiving notification of having detected a connection request to external services from a connection unit contained in an execution environment for verifying the operation and establishing an connection to the external services of the application program based on connecting information being set, copy the execution environment by a number matching with a count of the external services becoming operation verifying targets, to set connecting information to corresponding external services to the copied execution environments in respective connection units contained in the copied execution environments, and to continue verifying the operation per copied execution environment with respect to the corresponding external services connected by the respective connection units contained in the copied execution environments.

5 Claims, 14 Drawing Sheets

FIG.5

| VERSION | FORWARDING DESTINATION | FORWARDING DESTINATION | FORWARDING DESTINATION |
|---|---|---|---|
| RDB v1 | c12345 | 192.0.2.11 | 192.0.2.101:12345 |
| RDB v2 | | | 192.0.2.102:12345 |
| RDB v3 | | | 192.0.2.103:12345 |

FIG.6

| VERSION | FORWARDING DESTINATION | FORWARDING DESTINATION | FORWARDING DESTINATION |
|---|---|---|---|
| RDB v1 | c12345 | 192.0.2.11 | 192.0.2.101:12345 |
| RDB v2 | c23456 | 192.0.2.12 | 192.0.2.102:12345 |
| RDB v3 | c34567 | 192.0.2.13 | 192.0.2.103:12345 |

FIG.11

| | App1 | App2 | App3 | ... | AppM |
|---|---|---|---|---|---|
| TEST STEP 1 | | | | | |
| TEST STEP 2 | | | | | |
| TEST STEP 3 | | | | | |
| ⋮ | | | | | |
| TEST STEP N | | | | | |

FIG.12

| | App1 | App2 | App3 | ... | AppM |
|---|---|---|---|---|---|
| TEST STEP 1 | ▓ | | | | |
| TEST STEP 2 | ▓ | | | | |
| TEST STEP 3 | ▓ | | | | |
| ... | ▓ | | | | |
| TEST STEP N | ▓ | | | | |

FIG.13

| | App1 | App2 | App3 | ... | AppM |
|---|---|---|---|---|---|
| TEST STEP 1 | | | | | |
| TEST STEP 2 | | | | | |
| TEST STEP 3 | | | | | |
| ... | | | | | |
| TEST STEP N | | | | | |

INFORMATION PROCESSING APPARATUS AND OPERATION VERIFYING METHOD

CROSS-REFERENCE TO RELATED APPLICATION

This application is based upon and claims the benefit of priority of the prior Japanese Patent Application No. 2015-085861, filed on Apr. 20, 2015, the entire contents of which are incorporated herein by reference.

FIELD

The embodiments discussed herein are related to an information processing apparatus and an operation verifying method.

BACKGROUND

Along with configuring applications, there have been an increased number of opportunities to use external services and external middleware of applications. The external services are exemplified by Mashup, a micro service and other equivalent services for providing a new service by combining various categories of information and services. The middleware is exemplified by an RDB (Relational Database), an RDS (Relational Database Service), a KVS (Key-Value Store) and other equivalent middleware components to save and manage data.

Versions of the external services and the external middleware (both of which will hereinafter be generically termed "external services") configuring the applications are updated irrespective of the applications to be configured. Consequently, when the version of the external service is updated, the application does not operate as the case may be.

An operation of the application is verified ("tested" in another term in the following discussion) per version of the external service in order to check with which version of the external service the application operates. For example, the RDB is used as the external service, in which case an execution environment is prepared for every version of the RDB, and the application is tested.

[Patent document 1] Japanese Laid-Open Patent Publication No. 2010-191543
[Patent document 2] Japanese Laid-Open Patent Publication No. 2006-148558
[Patent document 3] Japanese National Publication of International Patent Application No. 2008-533542

SUMMARY

An aspect of the embodiments is an information processing apparatus to verify an operation of an application program. The information processing apparatus includes a processor configured to, upon receiving notification of having detected a connection request to external services from a connection unit contained in an execution environment for verifying the operation and establishing an connection to the external services of the application program based on connecting information being set, copy the execution environment by a number matching with a count of the external services becoming operation verifying targets, to set connecting information to corresponding external services to the copied execution environments in respective connection units contained in the copied execution environments, and to continue verifying the operation per copied execution environment with respect to the corresponding external services connected by the respective connection units contained in the copied execution environments.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 5 is a diagram illustrating an example of a container management table in the initial status;
FIG. 6 is a diagram illustrating an example of the container management table after copying the container;
FIG. 11 is a diagram schematically illustrating usage quantities of computing resources in a comparative example;
FIG. 12 is a diagram schematically illustrating the usage quantities of the computing resources in a test case not using the external service;
FIG. 13 is a diagram schematically illustrating the usage quantities of the computing resources in a test case using the external service.

DESCRIPTION OF EMBODIMENTS

A plurality of steps included in a test (which will hereinafter be also referred to as test steps) includes test steps not using the external services instanced by the RDBs and other equivalent services. The test is performed in the execution environment prepared per version of the external service, e.g., the RDB also with respect to the test step not using the external service, resulting in futile consumption of computing resources instanced by a processor, a memory and other equivalent resources.

Note that the check described above is also presumed to be conducted for each of external services having a variety of different attributes in addition to the external service having the different version.

The external service having the different attribute encompasses, e.g., different types of services each deemed to have a compatibility in addition to services being different in version of program or data used for the external service.

An embodiment of the present invention will hereinafter be described based on the drawings. A configuration of the following embodiment is an exemplification, and the present invention is not limited to the configuration of the embodiment.

Comparative Example

An application using an external service is tested, in which case the application is tested per, e.g., version of the external service, and this application test therefore involves preparing a plurality of execution environments. For instance, the application is executed on a plurality of virtual machines (VMs) and tested per version of the external service.

Figure 14:
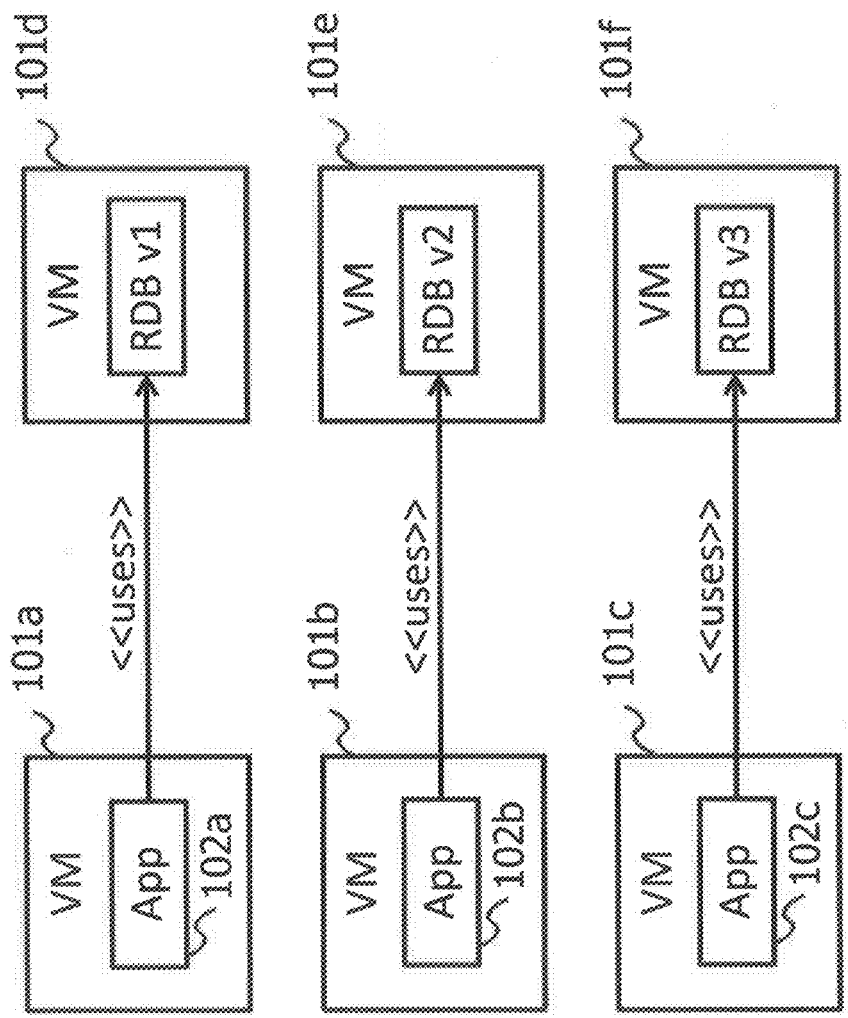
FIG. 14 is a diagram illustrating an example of parallel tests by virtual machines.

FIG. 14 is a diagram illustrating an instance of a parallel test using the VMs. The VMs 101a through 101f are prepared in FIG. 14. The VMs 101d through 101f contain databases RDBv1, RDBv2 and RDBv3 that are different in version from each other. The VMs 101a through 101c contain applications App102a, App102b and App102c using the databases RDBv1, RDBv2 and RDBv3.

The applications App102a, App102b and App102c are the same applications but different in connecting destination, and are executed respectively on the VMs 101a through 101c. The applications App102a, App102b and App102c are connected respectively to the VMs 101d through 101f, and use the databases RDBv1, RDBv2 and RDBv3. Thus, the applications executed on the plurality of virtual machines are connected to the different connecting destinations and are thereby enabled to perform the test per version of the database.

A configuration in FIG. 14 has a load applied for the virtual machine to virtualize the machine itself and is difficult to copy an image of the machine in a short period of time. Such being the case, a container for virtualizing not the machine itself but Operating System (OS) is also available. The container can perform the virtualization in a shorter period time and with a less load than by the virtual machine. In other words, the applications executed on the plurality of containers are connected to the different connecting destinations and are thereby enabled to perform the test per version of the database.

Such a case, however, exists that the test for the application includes test steps not using the databases. In this case, the tests performed in parallel per version of the database result in futility of computing resources.

Embodiment

The test for the application according to the embodiment is performed on a test-case-by-test-case basis including the plurality of test steps. The test steps not using external services instanced by the databases and other equivalent storage mechanisms are implemented in a single container during the test case. Upon detection of the test steps using the external services, the containers are copied. The respective copied containers continue the remaining test steps per version of the external service by diverting results of the test steps in the original containers to this purpose. The computing resources to be used before copying the containers are thereby reduced.

Note that the embodiment is described based on an assumption that the external services are to be the databases like the RDBs and other equivalent databases, but does not limit the external services to the databases. The external services may also be a variety of services used for configuring the applications such as external components and programs to the applications. The external services are contained in servers, the containers and other equivalent storage mechanisms that are connected from the execution environments of the applications. The external services may be installed per version in, e.g., different servers and other equivalent machines, and may also be installed in different containers within the same server.

The embodiment describes test targets as a plurality of versions of the external services but does not limit the test targets to the plurality of versions. The test targets may also be a plurality of middleware components and other equivalent software components of different vendors. More specifically, the configuration of the embodiment is applicable to different types of external services deemed compatible with each other. The different types of external services deemed compatible with each other encompass the middleware components, application services and other equivalent services of the different vendors, which are deemed pursuant to predetermined standards. The versions, the types, the vendors and other equivalent elements, which discriminate between the plurality of external services deemed compatible with each other, will hereinafter be generically referred to also as "attributes".

<Hardware Configuration>

Figure 1:
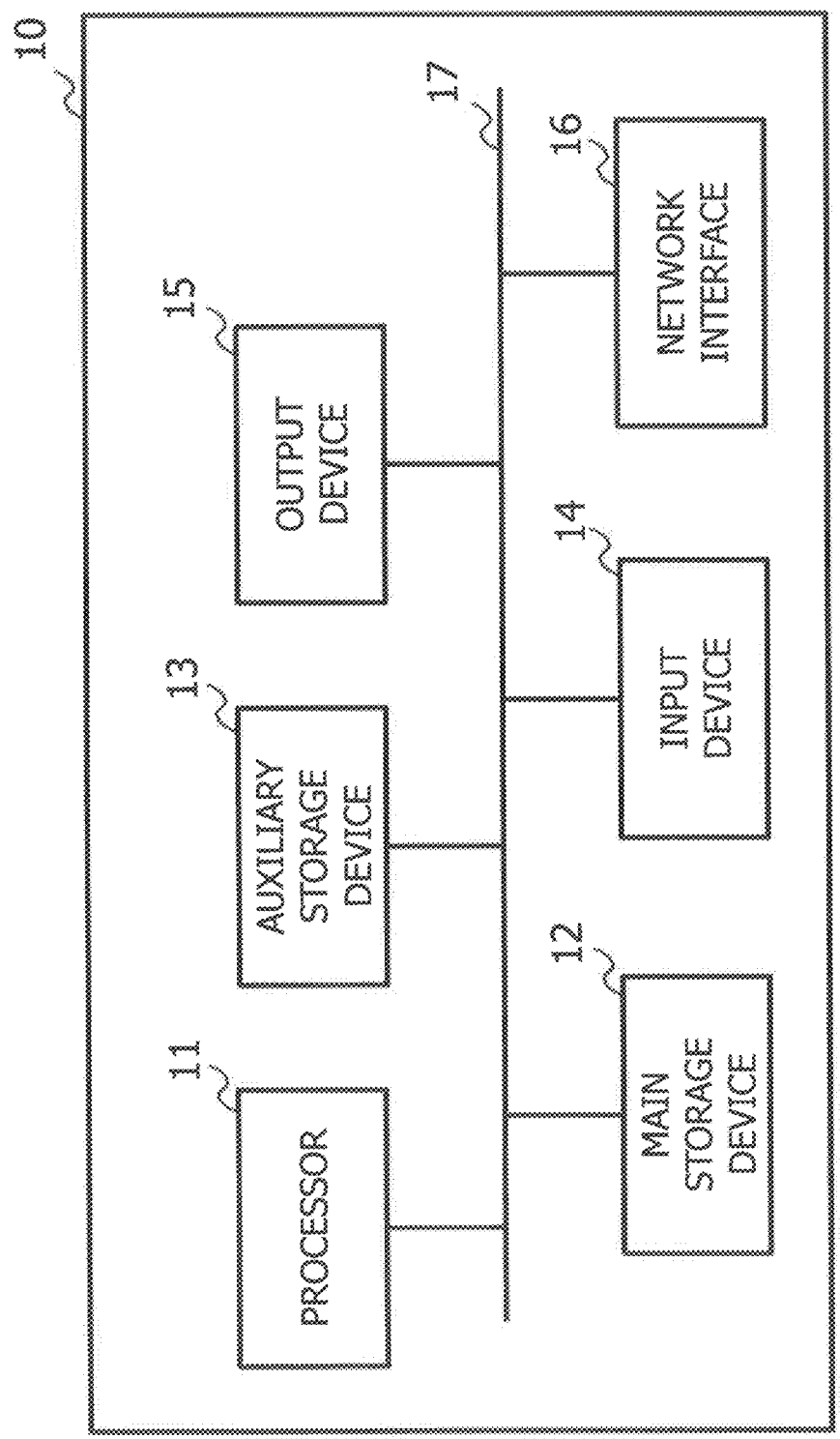
FIG. 1 is a diagram illustrating one example of a hardware configuration of an information processing apparatus.

FIG. 1 is a diagram illustrating one example of a hardware configuration of an information processing apparatus 10. The information processing apparatus 10 includes a processor 11, a main storage device 12, an auxiliary storage device 13, an input device 14, an output device 15, and a network interface 16. These components are interconnected via a bus 17.

The processor 11 loads the OS and various categories of computer programs are retained on the auxiliary storage device 13 into the main storage device 12 and runs these software components, thereby executing a variety of processes. Part of processes based on the computer programs may, however, be executed by a hardware circuit. The processor 11 is exemplified by a CPU (Central Processing Unit) and a DSP (Digital Signal Processor).

The main storage device 12 provides a storage area used for the processor 11 to load the programs stored in the auxiliary storage device 13, and a working area used for the processor 11 to run the programs. The main storage device 12 is used as a buffer to retain data. The main storage device 12 is exemplified by a semiconductor memory instanced by a ROM (Read Only Memory), a RAM (Random Access Memory) and other equivalent memories.

The auxiliary storage device 13 stores the various categories of programs and the data used for the processor 11 to run the programs. The auxiliary storage device 13 is exemplified by a nonvolatile memory instanced by an EPROM (Erasable Programmable ROM) or an HDD (Hard Disk Drive) and other equivalent storages. The auxiliary storage device 13 retains, e.g., the OS (Operating System), an operation verifying (testing) program and other multiple application programs. The auxiliary storage device 13 further retains information about connecting destinations of the copied containers.

The input device 14 accepts an operation input from a user. The input device 14 is exemplified by a pointing device instanced by a touch pad, a mouse and a touch panel, a circuit to receive a signal from a keyboard, an operation button and a remote controller, and other equivalent devices. The output device 15 outputs a result of the test performed by the information processing apparatus 10. The output device 15 is exemplified by an LCD (Liquid Crystal Display).

The network interface 16 is an interface for inputting and outputting the information to and from a network. The network interface 16 connects to a cable network or a wireless network. The network interface 16 is exemplified by a NIC (Network Interface Card), a wireless LAN (Local Area Network) card, and other equivalent interfaces. The data and other equivalent information received by the network interface 16 are output to the processor 11.

For example, in the information processing apparatus 10, the processor 11 loads the operation verifying program retained in the auxiliary storage device 13 into the main storage device 12, and runs the operation verifying program. Note that the hardware configuration of the information processing apparatus 10 is one example, and, without being limited to the configuration described above, components of the configuration may be properly omitted, replaced and added corresponding to the embodiment.

<Functional Configuration>

Figure 2:
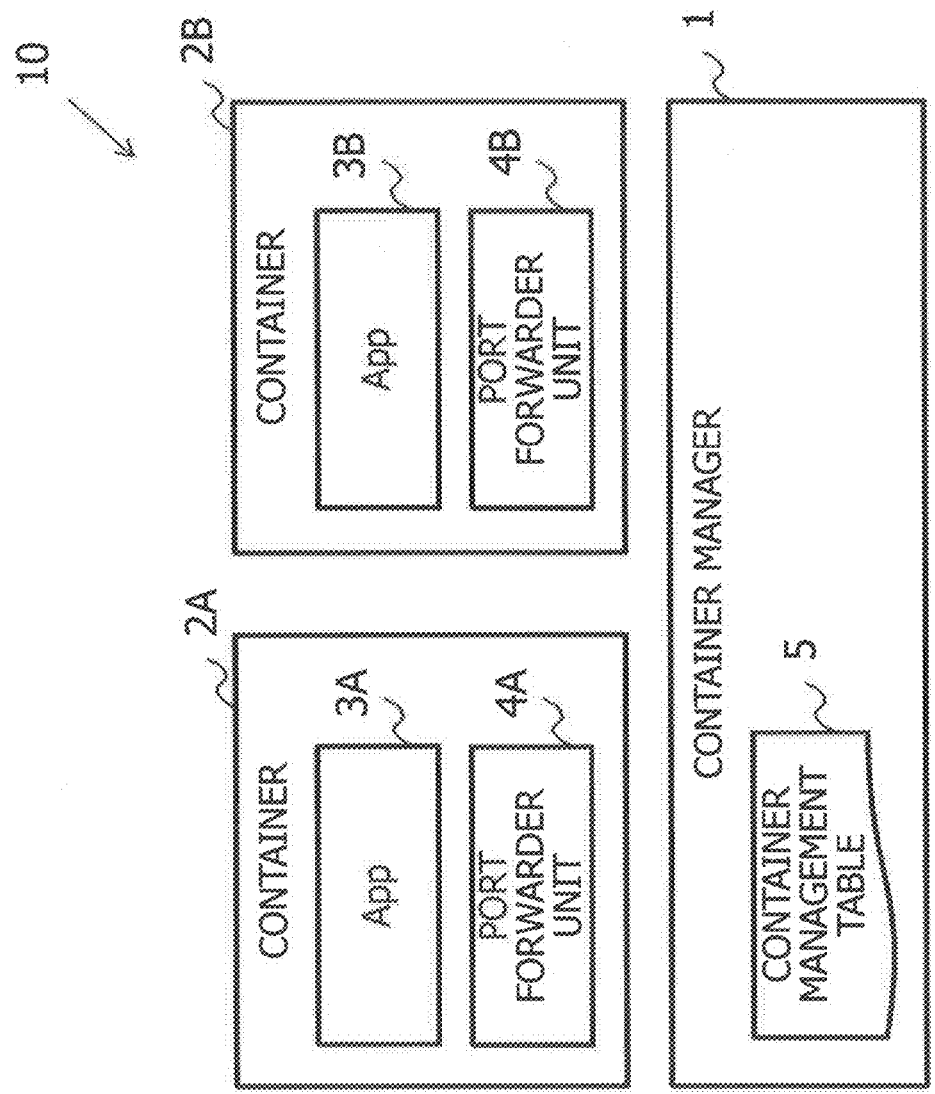
FIG. 2 is a diagram illustrating one example of a functional configuration of the information processing apparatus.

FIG. 2 is a diagram illustrating one example of a functional configuration of the information processing apparatus 10. The information processing apparatus 10 includes, as the functional configuration, a container manager 1, a container 2A and a container 2B. The container manager 1 includes a container management table 5. The container 2A includes an App 3A and a port forwarder unit 4A. Similarly, the container 2B includes an App 3B and a port forwarder unit 4B.

In FIG. 2, the container manager 1 includes the containers 2A and 2B, and further includes the containers by a number of copied containers without being limited to "2". The containers 2A, 2B and the copied containers will be generically termed containers 2. Similarly, the App 3A, the App 3B and other equivalent applications will be generically termed the App 3. The port forwarder unit 4B, 4B and other equivalent units will be generically termed the port forwarder unit 4.

The processor 11 of the information processing apparatus 10 executes, based on the computer program, processes of the container manager 1, the App 3 and the port forwarder units 4. However, any one of the container manager 1, the App 3 and the port forwarder units 4 or part of the processes thereof may also be executed by a hardware circuit.

The container manager 1 manages the containers 2. To be specific, the container manager 1 copies the containers 2, gives an instruction to start and continue testing the App 3, discards the copied containers 2, and performs other equivalent operations. The container manager 1 is one example of a "control unit".

The container 2 provides an environment for executing the application App 3. The container 2 is defined as a virtualized user space of the OS. An internal space of the OS is generally separated into a kernel space for managing physical resources and a user space for executing the applications. The container 2 is a space for virtualizing the OS by dividing the user space into a plurality of subspaces, and the resources used from each container are restricted. Each container 2 manages the resources instanced by processes, a file system, a network and other equivalent resources independently of other containers 2. The container 2 is one example of an "execution environment".

The App 3 is a test target application. The application normally contains a program for implementing the test case. A start of the test is triggered by a designation when booting the application and the application is executed in a pseudo manner. The App 3 starts implementing the test case by the instruction given from the container manager 1. When using the external service, the App 3 is connected not to the server and other equivalent machines including the external services but to the port forwarder unit 4. The connecting destination of the App 3 is switched over to the port forwarder unit 4 from the server by rewriting a configuration file and other equivalent data beforehand.

The port forwarder unit 4 controls the connecting destination of the App 3. The port forwarder unit 4, upon detecting a request for connection to the external service from the App 3, notifies the container manager 1 that the App 3 uses the external service. When the container manager 1 copies the container 2 upon receiving the notification from the port forwarder unit 4, the port forwarder unit 4 accepts an instruction to continue testing from the container manager 1. In this case, the port forwarder unit 4 of the copied container 2 also accepts a forwarding destination switchover instruction containing the connecting destination to an associated external service. The port forwarder unit 4 requests the associated external service to perform processing, and sends a processing result back to the App 3. The port forwarder unit 4 is one example of a "connection unit". The connecting destination is one example of "connecting information".

The container management table 5 stores an associated relation between the containers 2 and versions of the test target external services. The container manager 1, when copying the container 2, refers to the container management table 5, and thus sets the connecting destination of the external service having an associated version in the port forwarder unit 4 of the copied container 2.

<Copy of Container>

Figure 3:
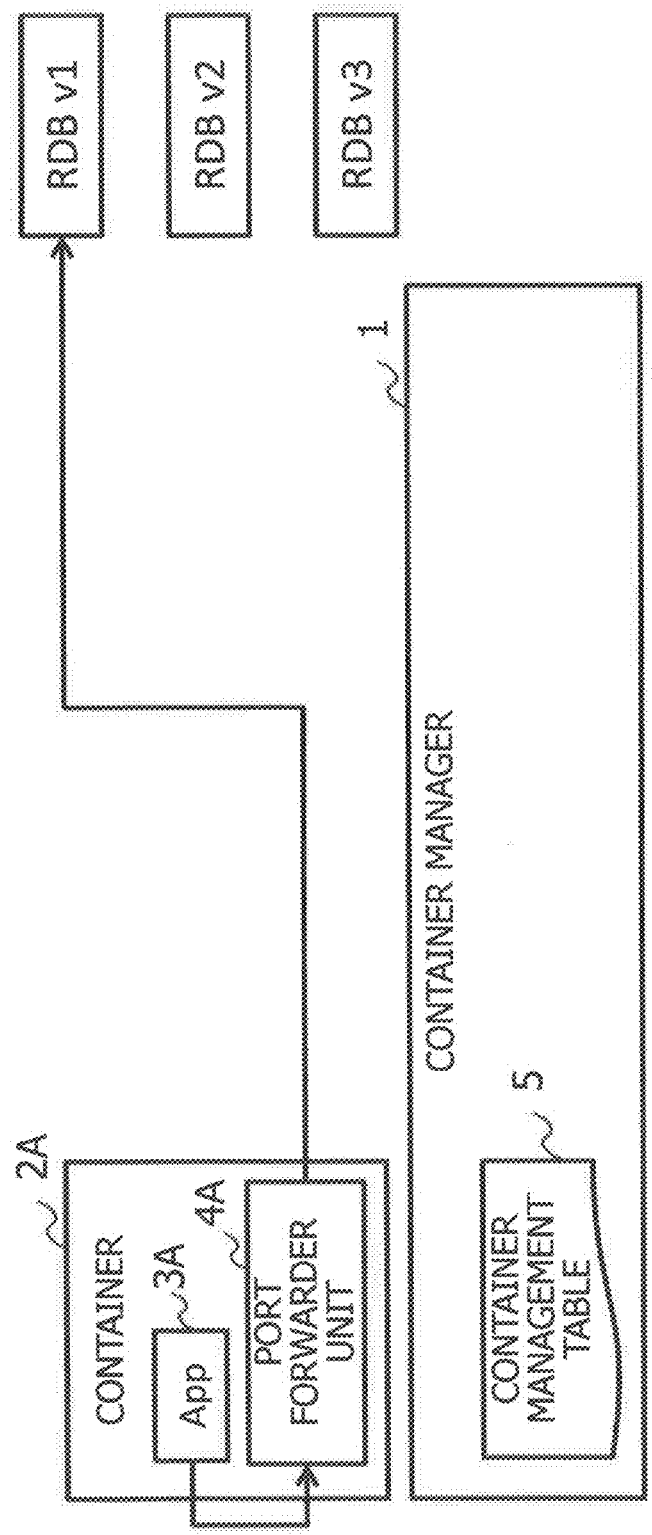
FIG. 3 is a diagram illustrating an example of a container and RDBs in an initial status.
Figure 4:
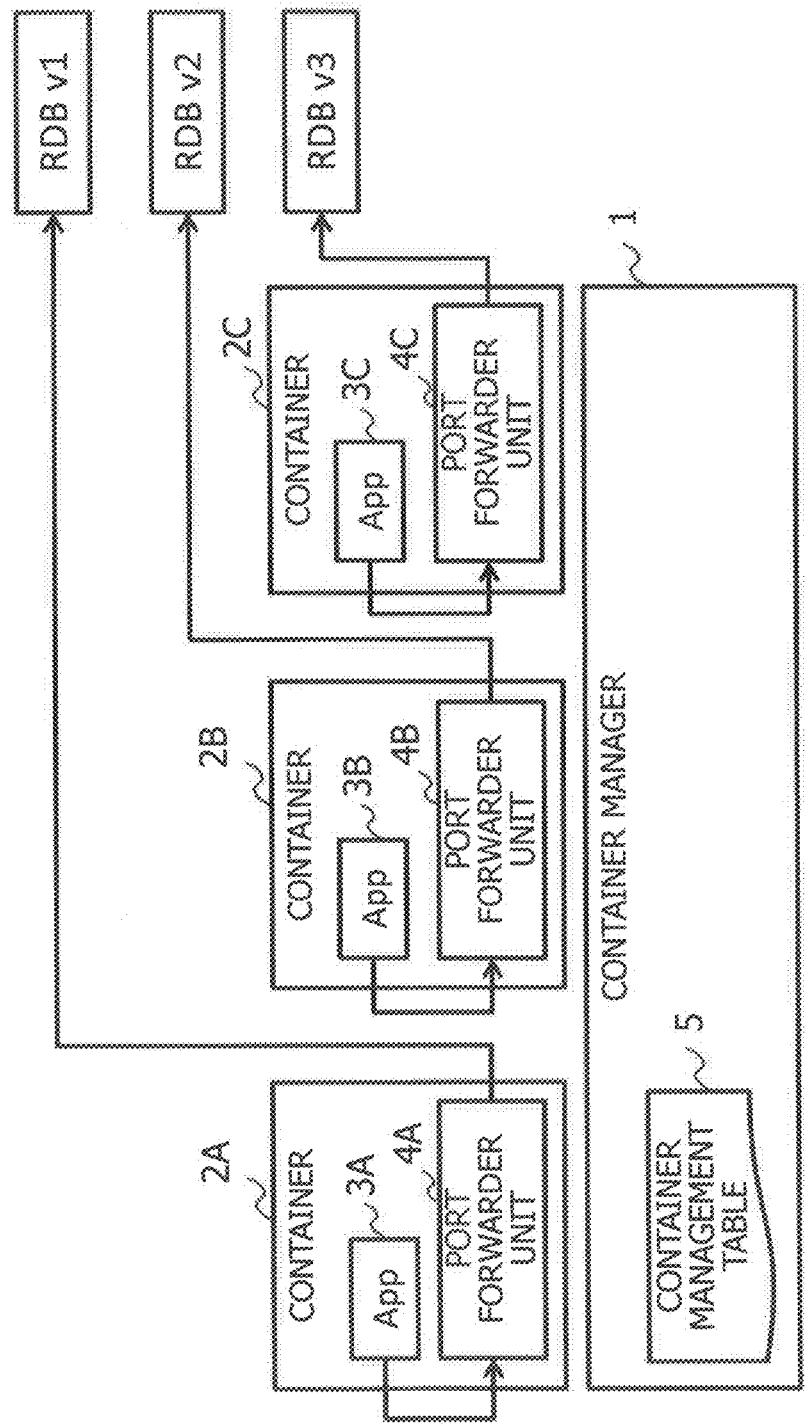
FIG. 4 is a diagram illustrating an example of the containers and the RDBs after copying the container.

The container manager 1, upon receiving from the port forwarder unit 4 the notification that the App 3 uses the external service, copies the container 2. FIGS. 3 through 6 are explanatory diagrams of how the container 2 is copied. FIGS. 3 and 4 illustrate instances of the containers 2 and the RDBs. FIGS. 5 and 6 illustrate instances of the container management table 5.

FIG. 3 is the diagram illustrating the example of the container 2 and the RDBs in an initial status. The container manager 1, the container 2A, the App 3A, the port forwarder unit 4A and the container management table 5 are the same as those in FIG. 2, and hence their explanations are omitted. An RDB v1, an RDB v2 and an RDB v3 are three versions of the test target RDB.

One container 2A exists in the initial status. The App 3A executed in the container 2A is connected to the port forwarder unit 4A when using the database. The port forwarder unit 4A forwards data given from the App 3A to the RDB v1.

FIG. 4 is the diagram illustrating an example of the containers after copying the container and the RDBs. The container manager 1, the container 2A, the App 3A, the port forwarder unit 4A, the container management table 5, the RDB v1, the RDB v2 and the RDB v3 are the same as those in FIG. 3, and hence their explanations are omitted.

After copying the container, there exist three containers, i.e., the container 2A, the container 2B and a container 2C. Upon detecting that the App 3A uses the database, the containers 2B and 2C are copied from the container 2A by the container manager 1.

The container manager 1 sets RDB v2 as the connecting destination of the App 3B in the port forwarder unit 4B. The container manager 1 further sets RDB v3 as the connecting destination of the App 3C in the port forwarder unit 4C.

The App 3B to be executed in the container 2B is connected to the port forwarder unit 4B when using the database. The port forwarder unit 4B forwards the data given from the App 3B to the RDB v2.

Similarly, the App 3C to be executed in the container 2C is connected to the port forwarder unit 4C when using the database. The port forwarder unit 4C forwards the data given from the App 3C to the RDB v3.

FIG. 5 is the diagram illustrating an example of the container management table 5 in the initial status. In FIG. 5, the container management table 5 stores items of information indicating a "container ID", an "IP address of container" and a "forwarding destination" per "version" of the RDB.

The "container ID" is an identifier of the container 2 connected to the RDB having the version concerned. The "IP address of container" is an IP address of the container 2 connected to the RDB having the version concerned. The "forwarding destination", which is a connecting destination to the RDB having the version concerned, is set in the port forwarder unit 4 when copying the container. The "forwarding destination" contains an IP address and a port number of a server and other equivalent machines including the RDBs.

The test targets RDBs have three versions in the example of FIG. 5. One container 2 to be connected to the RDB v1 exists in the initial status. The "container ID" of the container 2 is "c12345", and the "IP address of container" thereof is "192.0.2.11". The "forwarding destination" to the RDB v1 is "192.0.2.101:12345". The "forwarding destination" contains "192.0.2.101" defined as an IP address of the server or the equivalent machine inclusive of the RDB v1, and contains "12345" as a port number for performing communications with the RDB v1.

In the initial status, there exist none of the containers 2 connected to the RDB v2 and the RDB v3, and the container management table 5 stores neither the data of the "container ID" nor the data of the "IP addresses of container" associated with the RDB v2 and the RDB v3. The "forwarding destination" to the RDB v2 is "192.0.2.102:12345". The "forwarding destination" contains "192.0.2.102" defined as the IP address of the server or the equivalent machine inclusive of the RDB v2, and contains "12345" as the port number for performing the communications with the RDB v2. The "forwarding destination" to the RDB v3 is "192.0.2.103:12345". The "forwarding destination" contains "192.0.2.103" defined as the IP address of the server or the equivalent machine inclusive of the RDB v3, and contains "12345" as the port number for performing the communications with the RDB v3.

The port forwarder unit 4 waits for the connections at the port for receiving the communications from the App 3 and at the port for receiving the instruction from the container manager 1. For instance, the port number of the port for receiving the communications from the applications is set to "12345", and the port number of the port for receiving the instruction from the container manager 1 is set to "23456". In this case, the connecting destination to the port forwarder unit 4 from the App 3 becomes "127.0.0.1:12345".

The IP address "127.0.0.1" is an example of a local loopback address in IPv4, and indicates a local machine itself. The App 3, when connecting to the port forwarder unit 4 operating on the container 2 with the self App 3 being executed, can use this IP address. The container manager 1 issues the instruction to the port forwarder unit 4, in which case the connecting destination becomes "192.0.2.11:23456". An address "192.0.2.11" is an IP address of the container containing the port forwarder unit 4, and is the address used when establishing the connection from an outside of the container 2.

FIG. 6 is the diagram illustrating an example of the container management table 5 after copying the container. The items of data exclusive of the "container ID" and the "IP address of container" of the RDB v2 and the RDB v3 are the same as those in FIG. 5, and hence their explanations are omitted.

When copying the container, the container manager 1 registers the "container ID" and the "IP address of container" of the containers 2 connected to the RDB v2 and the RDB v3 in the container management table 5. In the example of FIG. 6, the "container ID" of the container 2 connected to the RDB v2 is "c23456", and the "IP address of container" thereof is "192.0.2.12". Further, the "container ID" of the container 2 connected to the RDB v3 is "c34567", and the "IP address of container" thereof is "192.0.2.13".

Operational Example

Figure 7:
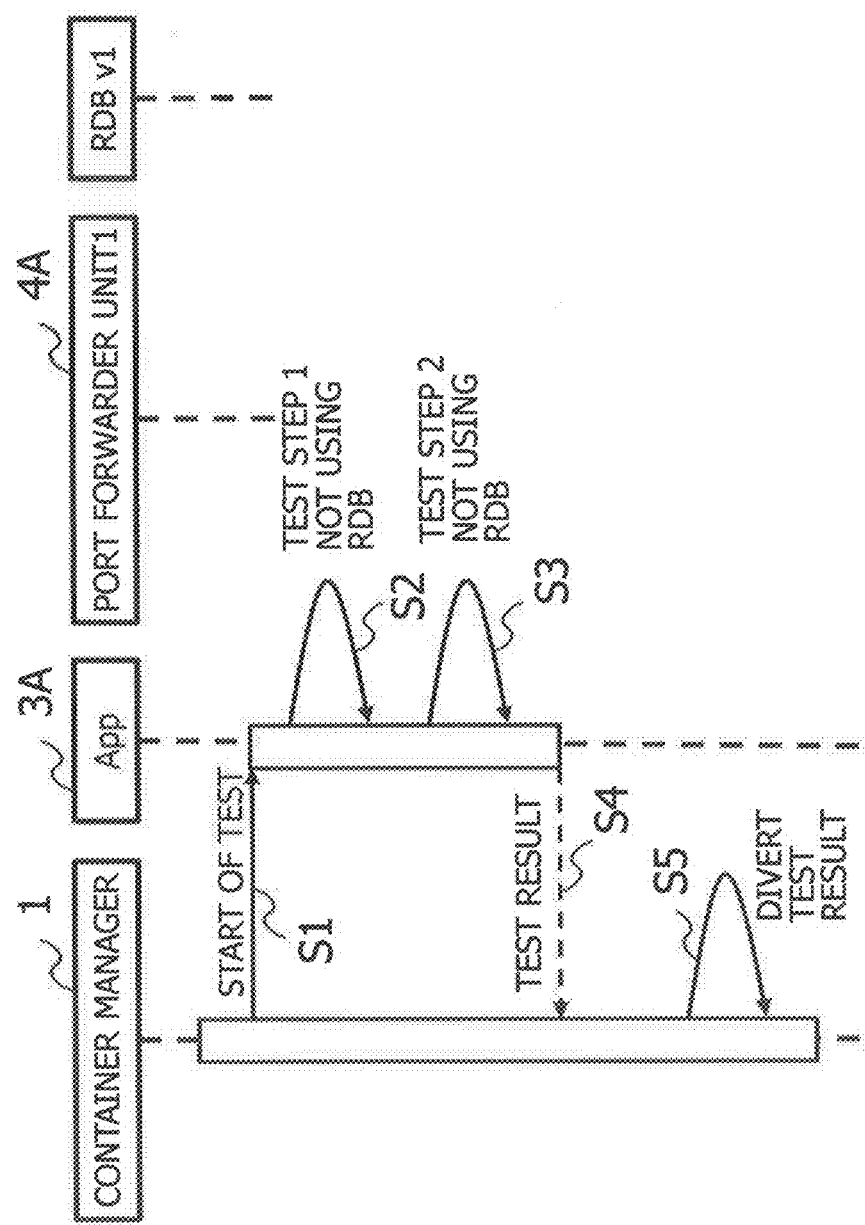
FIG. 7 illustrates one example of a sequence of a test case not using the RDB.
Figure 8:
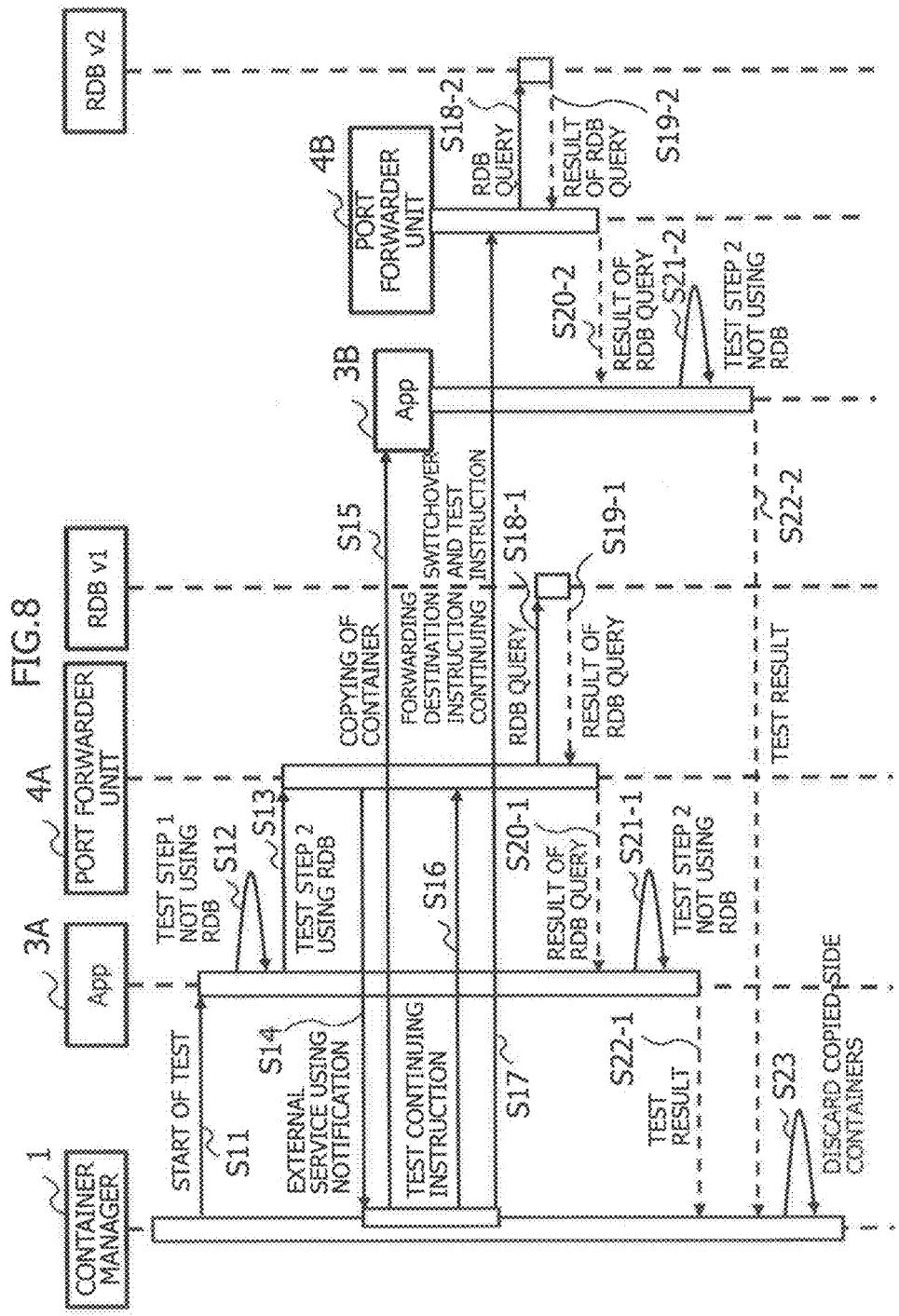
FIG. 8 illustrates one example of a sequence of a test case using the RDB.

FIGS. 7 and 8 depict operational examples of testing the applications for the RDBs having the plurality of versions.

FIG. 7 illustrates one example of a sequence of the test case not using the RDB. The example of FIG. 7 is that the container manager 1 performs testing the App 3A with respect to the test case not using the RDB v1. This test case does not use the RDB, and therefore the tests with respect to the RDBs of other versions acquire the same results. Accordingly, the test results of the test case for the App 3A are diverted to the tests with respect to the RDBs of other versions.

The container manager 1, the App 3, the port forwarder unit 4 and the RDB v1 in FIG. 7 have the same functional configurations indicated by the same numerals and symbols in FIG. 3, and hence their explanations are omitted.

In S1, the container manager 1 instructs the App 3A to start the test. In S2, the App 3A executes a test step 1 not using the RDB. In S3, the App 3A executes a test step 2 not using the RDB.

In S4, the App 3A returns the test results to the container manager 1. In S5, the container manager 1 diverts the test results acquired in S4 to the tests of other applications App 3 using the RDBs of the versions exclusive of the RDB v1.

FIG. 8 illustrates one example of a sequence of the test case using the RDB. The example in FIG. 8 is that the container manager 1 carries out the tests for the two versions RDB v1 and RDB v2 with respect to the test case using the RDB. The test case illustrated in FIG. 8 includes the test step 1 not using the RDB, the test step 1 using the RDB and the test step 2 not using the RDB.

The container manager 1, the App 3A, the App 3B, the port forwarder unit 4A, the port forwarder unit 4B, the RDB v1 and the RDB v2 in FIG. 8 are the same as the functional components indicated by the same numerals and symbols in FIG. 4, and hence their explanations are omitted.

Processes in S11 and S12 are the same as S1 and S2 in FIG. 7, and hence their explanations are omitted. In S13, the App 3A connects with the port forwarder unit 4A in order to execute the test step a using the RDB.

In S14, the port forwarder unit 4A notifies the container manager 1 that the App 3A uses the RDB v1 defined as the external service. In S15, the container manager 1 receiving the notification copies the container 2A containing the App 3A and the port forwarder unit 4A. The copied container 2B contains the App 3B and the port forwarder unit 4B.

In the example of FIG. 8, the test target RDB has two versions and may also have more versions than "2". It may be sufficient that a version count of the test target RDB is set in the configuration file before performing the test, and a version count registered in, e.g., the container management table 5 is also available. The version count of the test target RDB is "N", in which case the container manager 1 performs copying to acquire an (N−1) number of copied containers 2.

In S16, the container manager 1 instructs the port forwarder unit 4A serving as a copying side to continue the test case. In S17, the container manager 1 instructs the port forwarder unit 4B serving as a copied side to switch over a forwarding destination and to continue the test case. The instruction given to the port forwarder unit 4B from the container manager 1 includes the connecting destination to the RDB v2. The container manager 1 acquires the connecting destination to the RDB v2 from the container management table 5.

In S18-1, the port forwarder unit 4A makes a query to the RDB v1. In S19-1, the RDB v1 returns a result of query to the port forwarder unit 4A. In S20-1, the port forwarder unit 4A returns the result of query given from the RDB v1 to the App 3A.

In S21-1, the App 3A carries out the test step 2 not using the RDB, based on the result of query given from the RDB v1. In S21-1, the App 3A notifies the container manager 1 of test results.

The processes in S18-2 through S21-2 correspond respectively to the processes in S18-1 through S21-1, and are executed by the App 3B, the port forwarder unit 4B and the RDB v2 in place of the App 3A, the port forwarder unit 4A and the b RDB v1.

In S23, the container manager 1, upon receiving the test results from each App 3, discards the container 2 as the copied side. In the example of FIG. 8, the components to be discarded are the container 2B as the copied side, and the App 3B and the port forwarder unit 4B that are contained in the container 2B. A next test case is started upon finishing the test case concerned. The container manager 1 repeats implementing the test case according to the operational example in FIG. 7 or 8 till completing the test.

<Processing Flow>

Figure 9:
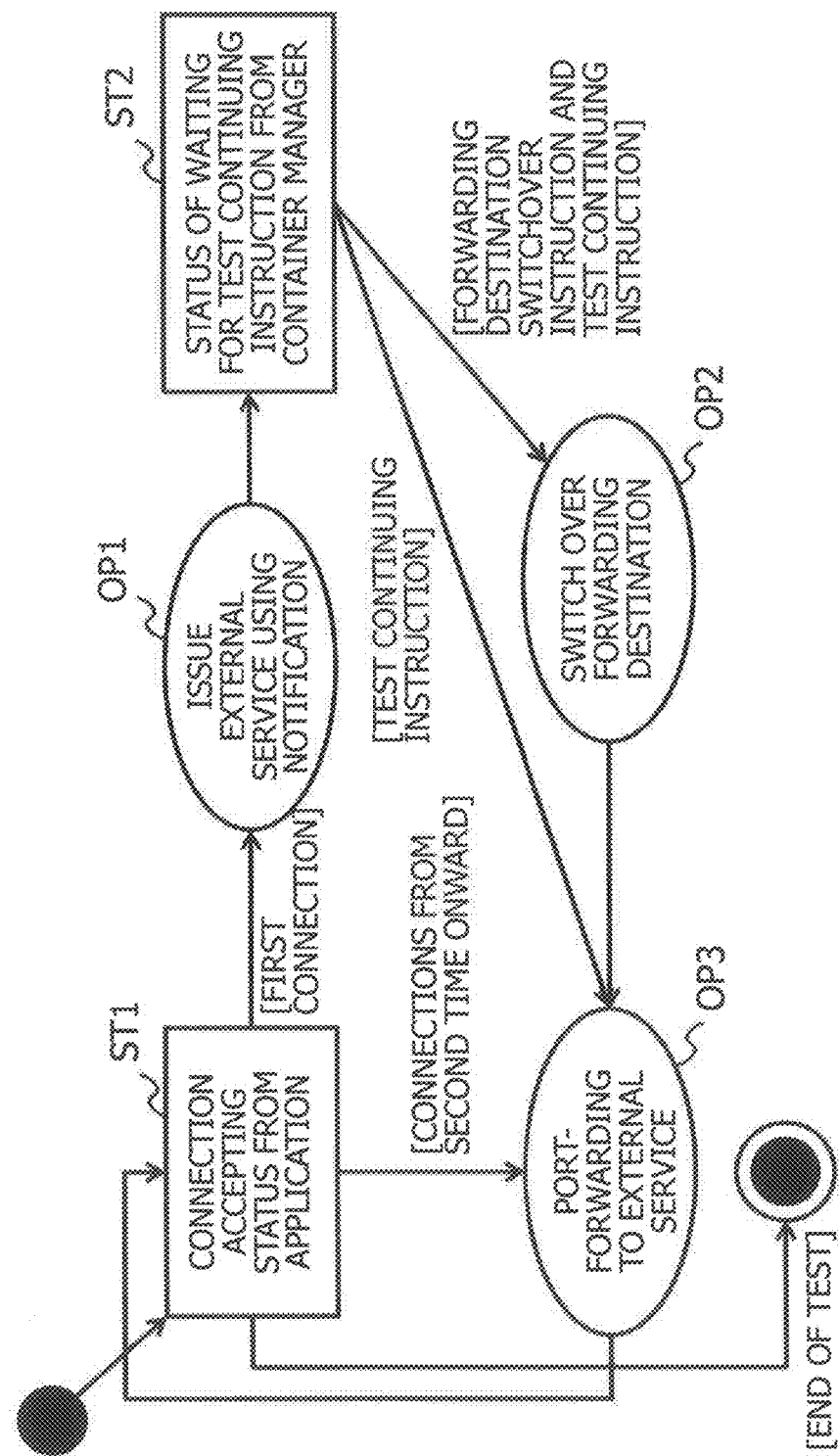
FIG. 9 illustrates one example of a flowchart of a port forwarder unit.

FIG. 9 illustrates one example of a flowchart of the port forwarder unit 4. A start of processes of the port forwarder unit 4 is triggered by, e.g., an event that the container manager 1 instructs the App 3A to start the test. Note that the processor 11 is an entity of subject performing an operation of the flowchart illustrated in FIG. 9, and the discussion will, however, be made on the assumption that the port forwarder unit 4 is to be the subject performing the operation in FIG. 9.

In ST1, along with the start of the test, the port forwarder unit 4 reaches a status of accepting the connection from the App 3A. The port forwarder unit 4 advances in process to OP1 when accepting a first connection but turns in process to OP3 when accepting the connections from second time onward.

In OP1, the port forwarder unit 4 notifies the container manager 1 that the App 3 uses the external service, and the status transitions to ST2. In ST2, the port forwarder unit 4 reaches a status of waiting for an instruction to continue the test from the container manager 1.

At this time, the container manager 1 copies the container 2 by a number matching with the version count of the test target external service. The port forwarder unit 4 of the copied container 2 reaches the status in ST2, i.e., the status of waiting for the instruction to continue the test from the container manager 1.

The copying-side port forwarder unit 4 of the container 2 receives the instruction to continue the test from the container manager 1. Next, the processing advances to OP3. On the other hand, the copied-side port forwarder unit 4 of the copied container 2 receives the forwarding destination switchover instruction and the test continuing instruction from the container manager 1. Subsequently, the processing advances to OP2. In OP2, the port forwarder unit 4 switches over setting of the forwarding destination to the external service to the connecting destination contained in the instruction given from the container manager 1. Next, the processing advances to OP3.

In OP3, the port forwarder unit 4 performs port-forwarding the connection from the App 3 to the external service having the associated version. The "port-forwarding" connotes "forwarding data sent to a specified port to a specified port via another communication path". Subsequently, the status transitions to ST1. In ST1, the port forwarder unit 4 finishes processing upon an end of the test.

Figure 10:
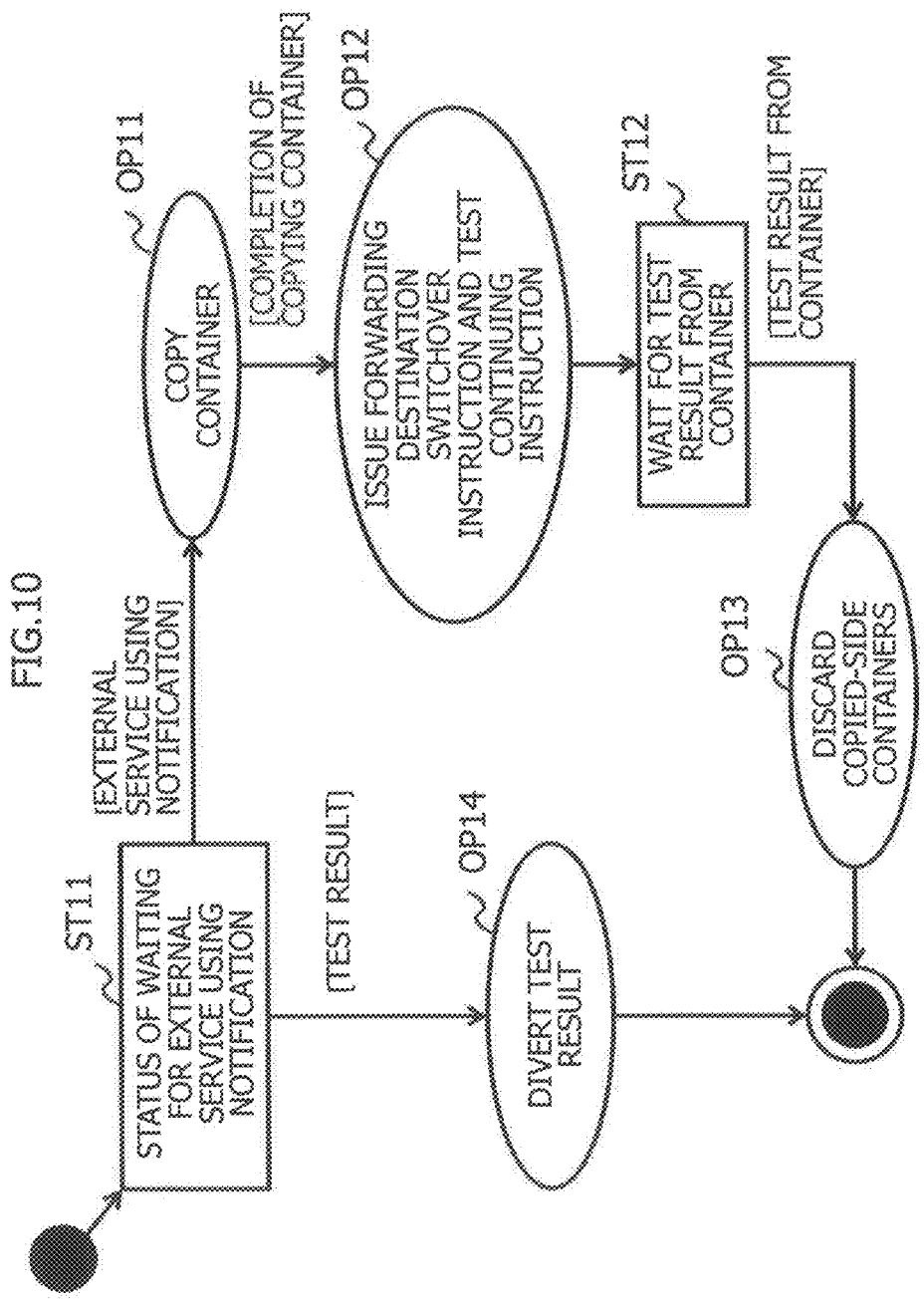
FIG. 10 illustrates one example of a flowchart of a container manager.

FIG. 10 illustrates one example of a flowchart of the container manager 1. A start of processes of the container manager 1 is triggered by, e.g., the event that the container manager 1 instructs the App 3A to start the test. Note that the processor 11 is the entity of subject performing an operation of the flowchart illustrated in FIG. 10, and the discussion, however, will be made on the assumption that the container manager 1 is to be the subject performing the operation in FIG. 10.

In ST11, the container manager 1, when giving the instruction to start the test, reaches a status of waiting for external service using notification from the port forwarder unit 4. The external service using notification is notification purporting that the App 3 uses the external service. The container manager 1 advances in process to OP11 when receiving the external service using notification, but turns in process to OP14 when receiving the test results.

In OP11, the container manager 1 copies the container 2 by a number matching with a test target version count of the external service. When the copying of the container 2 is completed, the processing advances to OP12.

In OP12, the container manager 1 issues the forwarding destination switchover instruction and the test continuing instruction. At this time, the container manager 1 issues the test continuing instruction to the copying-side container 2. The container manager 1 further issues the forwarding destination switchover instruction and the test continuing instruction to the copied-side container 2. Next, the status transitions to ST12.

In ST12, the container manager 1 waits for the test results from the respective containers. The container manager 1 advances in process to OP13 when receiving the test results from the individual containers. In OP13, the container manager 1 discards the copied-side containers 2, and terminates the processes of the container manager itself.

OP14 is a process when the container manager 1 receives not the external service using notification but the test results in the status of ST11. In other words, the external service is not used for the test case. Therefore, in OP14, the container manager 1 diverts the received test results also to the tests for other versions of the external service, and terminates the processes of the container manager itself.

<Operational Effect of Embodiment>

The application test is performed for the external service having a plurality of attributes, in which case the results of the test performed with one application are diverted to other applications with respect to the test case not using the external service. The container manager 1 is thereby enabled to reduce the resources used for implementing the test case concerned.

With respect to the test case using the external service, the results of the test performed by one application are diverted to other applications in the test step before using the external service. The subsequent test steps are executed continuously per application. The container manager 1 is thereby enabled to reduce the resources to be used in the test step before using the external service.

In response to a connection request from the App 3, the port forwarder unit 4 establishes the connection to the external service as the connecting destination, of which the notification is given from the container manager 1. Therefore, the App 3 is connected to the external service having the associated attribute without controlling the connecting destination to the external service, and can perform the test. The container manager 1 is thereby enabled to shift to the test per attribute of the external service when detecting the use of the external service and copying the container 2. The container manager 1 diverts the pre-copying test results to the test per attribute of the external service, and is thereby enabled to reduce the resources used for the tests.

The container manager 1 can perform not only the test per different version of the external service but also the test per attribute of the external services deemed to have compatibilities with each other as instanced by a test per type of the middleware of the different vendor. The container manager 1 is thereby enabled, also in the test per attribute of the external services deemed to have the compatibilities with each other, to reduce the resources used for the test.

FIGS. 11 through 13 will concretely illustrate usage quantities of the computing resources, which are to be reduced. Examples of FIGS. 11 through 13 provide an M-number of test target versions of the external service, and prepare applications App1 through AppM for testing the respective versions. The test case includes an N-number of test steps, i.e., a test step 1 through a test step N.

In tables structured to arrange the App1 through AppM in a crosswise direction and the test step 1 through the test step N in a vertical direction, fields of the test steps executed per applications are to be colored (grayed) in background. The computing resources in FIGS. 11 through 13 are compared with each other on the assumption that a number of the fields colored in background is to correspond to the usage quantity of the computing resources.

FIG. 11 is the diagram schematically illustrating the usage quantities of the computing resources in the comparative example. When individually performing the tests of the respective applications, the quantities of the computing resources used for the tests are proportional to "M". Supposing that the N-number of test steps each expend the same period of time, the time expended for the test is proportional to "N". In FIG. 11, the test steps 1 through N are executed for the M-number of applications, and the computing resources to be used can be therefore expressed by "M×N".

FIG. 12 is the diagram schematically illustrating the usage quantities of the computing resources in the test case not using the external service. In the test case not using the external service, it may be sufficient that the container manager 1 implements the test case by one application and diverts the acquired test results to the tests for other applications.

In FIG. 12, the test steps 1 through N are executed for one application App1, and App2 through AppM divert the test results of App1. The computing resources to be used can be therefore expressed by "1×N". As compared with the case in FIG. 11, the computing resources to be used becomes 1/M.

FIG. 13 is the diagram schematically illustrating the usage quantities of the computing resources in the test case using the external service. In the test case using the external service, the container manager 1 executes the test steps before using the external service by one application. The container manager 1 copies the container 2 before executing the test steps using the external service. The container manager 1 continues the test of each application on the copied containers 2.

In FIG. 13, the test steps 1 and 2 are executed for one application App1, and the applications App2 through AppM divert the test results of the App1 to the test steps 1 and 2. The container manager 1 copies the container 2 before executing the test step 3, and the tests of the App2 through AppM are continued on the copied containers 2 by the test steps from the test step 3 onward. The computing resources to be used can be reduced by "2×(M−1)" as compared with the case in FIG. 11.

Modified Example

The embodiment is described by exemplifying the test per version of the database but is not limited to this exemplification. For example, an application, using REST API (Representational State Transfer Application Programming Interface) for attaining cooperation between or among a plurality of software components, also attempts reducing the resources to be used for the tests by diverting the results of the test case or the test steps not using the external service.

Further, a test, not per version of the external service but, e.g., per attribute based on a difference between the vendors of the external services, attempts reducing the resources to be used for the tests by diverting the results of the test case or the test steps not using the external service.

The information processing apparatus, the operation verifying method and the operation verifying program of the disclosure enable a reduction of the resources used for verifying the operation of the application using the external service.

<Non-Transitory Recording Medium>

A program making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and run the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. A hard disc, a ROM (Read-Only Memory) and other equivalent recording mediums are given as the non-transitory recording mediums fixed within the computer and other equivalent apparatuses. Further, a solid state drive (SSD) is also available as the non-transitory recording medium removable from the computer and other equivalent apparatuses and also as the non-transitory recording medium fixed within the computer and other equivalent apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus to verify an operation of an application program, the information processing apparatus comprising:
   a processor configured to, upon receiving notification of having detected a connection request to external services from a connection unit contained in an original execution environment for verifying the operation and establishing a connection to the external services of the application program based on connecting information being set, copy the original execution environment according to a number corresponding to a count of the external services becoming operation verifying targets,
   to set connecting information for connecting to corresponding external services that correspond to copied execution environment to respective connection units contained in the copied execution environment, and
   to continue verifying the operation per copied execution environment with respect to the corresponding external services connected by the respective connection units contained in the copied execution environment,
   the verifying the operation includes a plurality of test steps,
   the original execution environment executes some test steps until receiving the notification, the some test steps being included in the plurality of test steps, and
   the copied execution environment uses results of the some test steps and executes remaining test steps.

2. The information processing apparatus according to claim 1, wherein the respective connection units in the copied execution environment establish the connection to the corresponding external services, based on the connecting information being set to the respective connection units.

3. The information processing apparatus according to claim 1, wherein the external services becoming the operation verifying targets have compatibilities with each other and have different attributes.

4. An operation verifying method for verifying an operation of an application program, the operation verifying method comprising:
   copying, by a processor of an information processing apparatus, an original execution environment according to a number corresponding to a count of external services becoming operation verifying targets upon receiving notification of having detected a connection request to the external services from a connection unit contained in the execution environment for verifying the operation and establishing a connection to the external services of the application program based on connecting information being set;
   setting connecting information for connecting to corresponding external services that correspond to the copied execution environment to respective connection units contained in the copied execution environment; and
   continuing the verification of the operation per copied execution environment with respect to the corresponding external services connected by the respective connection units contained in the copied execution environment,
   the verifying the operation includes a plurality of test steps,
   the original execution environment executes some test steps until receiving the notification, the some test steps being included in the plurality of test steps, and
   the copied execution environment uses results of the some test steps and executes remaining test steps.

5. A non-transitory computer-readable recording medium having stored therein a program for causing an information processing apparatus to execute a process for verifying an operation of an application program, the process comprising:
   copying an original execution environment according to a number corresponding to a count of external services becoming operation verifying targets upon receiving notification of having detected a connection request to the external services from a connection unit contained in the original execution environment for verifying the operation and establishing a connection to the external services of the application program based on connecting information being set;
   setting connecting information for connecting to corresponding external services that correspond to the copied execution environment to respective connection units contained in the copied execution environment; and
   continuing the verification of the operation per copied execution environment with respect to the corresponding external services connected by the respective connection units contained in the copied execution environment,
   the verifying the operation includes a plurality of test steps,
   the original execution environment executes some test steps until receiving the notification, the some test steps being included in the plurality of test steps, and
   the copied execution environment uses results of the some test steps and executes remaining test steps.

* * * * *